United States Patent [19]

Bogdany

[11] Patent Number: 4,957,798
[45] Date of Patent: Sep. 18, 1990

[54] COMPOSITE OPEN-CELL FOAM STRUCTURE

[75] Inventor: John Bogdany, Oglethorpe, Ga.

[73] Assignee: Resilient System, Inc., Dalton, Ga.

[21] Appl. No.: 331,183

[22] Filed: Mar. 31, 1989

Related U.S. Application Data

[63] Continuation-in-part of Ser. No. 163,010, Mar. 2, 1988, abandoned.

[51] Int. Cl.⁵ .............................................. B32B 3/26
[52] U.S. Cl. .................................. 428/95; 156/307.3; 428/317.1; 428/320.2; 428/322.7; 521/54
[58] Field of Search ......................... 521/53, 54, 55; 428/317.1, 317.7, 320.2, 322.7; 156/307.3

[56] References Cited

U.S. PATENT DOCUMENTS

| | | | |
|---|---|---|---|
| 4,008,350 | 2/1977 | Crawford | 521/54 |
| 4,042,746 | 8/1977 | Hofer | 428/316.6 |
| 4,169,184 | 9/1979 | Pufahl | 428/317.3 |
| 4,224,374 | 9/1980 | Priest | 521/53 |
| 4,239,571 | 12/1980 | Cobb | 156/196 |
| 4,260,688 | 4/1981 | Simon | 521/54 |
| 4,279,953 | 7/1981 | Barden et al. | 428/95 |
| 4,288,559 | 9/1981 | Illger et al. | 521/55 |
| 4,455,396 | 6/1984 | Al-Tabaqchall et al. | 521/54 |
| 4,547,526 | 10/1985 | Al-Tabaqchall et al. | 521/54 |

Primary Examiner—William J. Van Balen
Attorney, Agent, or Firm—Kerkam, Stowell, Kondracki & Clarke

[57] ABSTRACT

A carpet underlay cushion structure is provided having a carrier layer of an open-cell, resilient polyurethane foam material substantially completely impregnated with a latex such as a non-carboxylated styrene-butadiene rubber or natural rubber, the foam material further having a woven substrate adhered thereto, the impregnated foam material being dried and cured to form a foamed, open-cell, resilient composite cushion structure wherein the open cells thereof partially comprise the carrier layer of polyurethane foam material.

19 Claims, 2 Drawing Sheets

COMPOSITE OPEN-CELL FOAM STRUCTURE

CROSS-REFERENCE TO RELATED APPLICATION

This application is a continuation-in-part of U.S. patent application Ser. No. 163,010, filed Mar. 2, 1988, now abandoned.

BACKGROUND OF THE INVENTION

1. Field of the Invention

The present invention relates to open-cell resilient foam materials, and particularly to resilient foam materials for use as a carpet cushion underlay.

2. Prior Art

One of the outstanding advances in the plastics industry has been the development of polyurethane foams which are cellular plastic materials generally formed by the reaction of long chain polyol compounds and organic polyisocyanates. Cellular plastics are available in various degrees of rigidity, ranging from soft, flexible foams useful in cushioning, clothing interliners, rug underlays, sponges and bath mats; semi-rigid foams, useful particularly as crash pads; and rigid foams for structural and insulation purposes. The final properties of the urethane foams depend principally on the choice of polyethers, polyesters or other long chain polyhydroxyl compounds which are converted by the polyisocyanate into a high molecular weight polymer which is then foamed by a suitable foaming system, usually a reaction of water with the free isocyanate content of the polymer, resulting in the formation of carbon dioxide which expands the resin into the desired cellular plastic. The control of branching in the reactants permits an extremely wide range of properties in the final foamed plastic. The density of the foam is controlled to a great extent by the amount of water employed. The configuration of the cell depends principally on the equivalent weight of the long chain polyhydroxyl materials favoring the production of a closed cell structure and the higher equivalent weight polyhydroxyl materials leading to the open-cell structure. The degree of branching of the polyhydroxyl reactant also influences the cell character.

The flexible and semi-rigid foams are processed for the aforementioned applications in a manner such that the foam has a low density, usually from about 1.25 to 4 pounds per cubic foot, and preferably as low a density as is consistent with the provisions of a product of adequate strength, etc. Moreover, such flexible and semi-rigid foams should have an open-celled structure for most applications, which is to say that essentially all (i.e., at least about 90 per cent), of the cells are intercommunicating since such a foam configuration is essential to the realization of acceptable foams for cushioning, clothing interliners, crash pads or the like. Rigid foams, in contradistinction, may have varying density values ranging up to 30 pounds per cubic foot or higher, and usually have a closed cell structure.

For certain applications, including padding utilized under carpet, however, it is often desired to utilize materials other than polyurethanes. Unfortunately, however, other polymer systems do not lend themselves readily to being formed into opencell, resilient structures. Generally, such structures are formed from latexes containing the desired polymer. The two most widely used procedures are the so-called Dunlap and Taladay foaming methods.

The Dunlap process utilizes a mechanical "foaming machine", e.g., the "Oakes" foamer or "Firestone" foamer whereby air is whipped into an aqueous latex compound (either SBR and/or natural latex). One frothed, a "gelling" agent (sodium silicon fluoride, potassium silicon fluoride and/or ammonium acetate) is introduced to cause the latex system to coagulate and assume a semi-solid (putty-like) consistency which can then be subjected to heat and allowed to cure in order to hold a desired shape. The Dunlap process will not produce a thick foam structure on a continuous basis. It is generally used to produce molded pieces of various thicknesses.

The Taladay method is much like the "Dunlap Process" except that, instead of using a chemical gelation, it freezes the foam by introducing carbon dioxide gas into the system to cause coagulation of the latex. Once coagulated, the normal curing takes place.

It is almost impossible, however, to produce large or continuous foamed materials by these methods higher than about $\frac{3}{8}$ inch due to the fact that at the greater heights, the foam cells collapse causing uneven gauge and inferior physical properties.

The qualities of available polymers, however, such as the compression resistance and flexibility of the synthetic and natural rubbers, the fire-retardant properties of polyvinyl chloride, etc., make these systems very desirable for specific applications, e.g., padding materials, especially carpet padding or cushion underlay.

Several prior patents disclose polyurethane foam materials being impregnated with various other compositions in order to obtain changes in particular characteristics of the polyurethane foam, however, none of these patents, discussed briefly below, provides an impregnated polyurethane foam structure having improved properties which are particularly useful as an improved padding or cushion underlay material for use under carpet.

U.S. Pat. No. 4,008,350, issued to Crawford et al, discloses an open-celled polyurethane foam impregnated with acrylic latices. The use described for this product is for a lining or padding material for use between the foot or leg and a ski boot. As indicated in the specification of that patent, the resinous acrylic latices retard the response of the foam to compressive stresses, and slow the tendency of the foam to recover to its original dimensions. As such, the product is not well suited for use as a carpet cushion underlay.

U.S. Pat. No. 4,169,184, issued to Pufahl, discloses a pressure sensitive adhesive structure. The polyurethane foam disclosed therein is to some extent (approximately 40%) opencelled, but it is a high density polyurethane, ranging from between 20–60 lbs./ft.$^3$. The end product is made from this high density base foam having a thickness in the range of 15–35 mils, and is impregnated with a polychloroprene (neoprene) latex. Such a product would not yield a useful material for a carpet cushion underlay material.

U.S. Pat. No. 4,279,953, issued to Barden et al, discloses a heat resistant product for use between an automobile floorboard and the floor carpeting in the automobile. This product is not intended to be used as a cushion or padding, nor would it perform particularly well in such service. This patent teaches the use of carboxylated styrene-butadiene rubber (SBR) as an impregnating material, and only the outer surface portions of a polyurethane foam are impregnated. Carboxylated SBR imparts little or no resiliency to the final product, and the less than complete impregnation of the polyurethane foam provides no substantial improvement in resiliency of the foam.

U.S. Pat. No. 4,288,559, issued to Illger et al discloses the use of a foam material, preferably a polyurethane foam, impregnated with a dispersion of aluminum hydroxide, polyurethane latex and mixing stabilizers. The end product in this patent is touted as providing a foam material having increased flame resistance without impairment of the mechanical properties of the foam. As indicated previously, polyurethane foam has shortcomings in several respects for use as a carpet cushion underlay.

U.S. Pat. Nos. 4,547,526 and 4,455,396, issued to Al-Tabaqchali et al disclose a polyurethane foam impregnated with an aqueous dispersion of an acrylate and a flame protection agent which includes a aluminum trihydrate. Like the Illeger et al patent discussed above, the products disclosed are directed to providing increased resistance to flame without impairment of the original mechanical properties of the foam. The use of an acrylate in the impregnant is indicated as providing better resistance to aging than a polychloroprene latex would provide.

U.S. Pat. No. 4,239,571, issued to Cobb, is directed to a polyurethane foam which is impregnated with a liquid thermosetting resin which is cured while the foam is in compression. The resulting structure is not open-celled and is not sufficiently resilient for use as a carpet cushion underlay.

U.S. Pat. No. 4,224,374, issued to Priest, discloses a polyurethane foam substrate impregnated with a carboxylated neoprene latex mixture having alumina trihydrate included for increased fire resistance. Like the products disclosed in the Illger et al and Al-Tabaqchali et al patents, the object of impregnating the foam is to impart fire or flame resistance to the foam without affecting or impairing the mechanical properties of the substrate.

U.S. Pat. No. 4,260,688, issued to Simon, discloses yet another approach to flame-proofing a polyurethane foam without disturbing the physical properties of the foamed plastic. This patent discloses an impregnant including a carboxylated vinylidene-butadiene copolymer and aqueous ammoniacal combinations of benzenephosphonic acid and melamine salts.

U.S. Pat. No. 4,042,746, issued to Hofer, discloses a multilayered composite structure having a rigid foam core member. One or more open-celled, initially resilient polyurethane foam layers are impregnated with a thermosetting or polymerizable liquid resin which is cured under compression with the rigid foam core at the center and a reinforcing fiberglass layer laminated at an outer surface. The resulting structure is not resilient, and in that respect it could not be used as a padding or cushion material for carpet.

The systems and methods described in the above-identified patents are found lacking in disclosing an improved carpet cushion underlay having an impregnated foam structure. Further, none of the prior art systems disclose the impregnation of a foamed material with a solution containing greater than 80% solids, and up to 88% solids. The preferred ranges in these patents go up to only about 60–65% solids, and only the Illger et al patent discusses the possibility of using a solution having up to 80% solids.

It is therefore a principal object of the present invention to provide an improved carpet padding or carpet cushion underlay having improved mechanical properties over unimpregnated low-density polyurethane foams.

It is a further object of the present invention to provide an improved carpet padding structure having an open-celled polyurethane form carrier impregnated with a latex containing a cold or non-carboxylated styrene-butadiene copolymer or a natural rubber or a combination of these two, the structure further having a substrate or scrim bonded thereto by adhesive or by the dried impregnant.

It is a further object of the present invention to provide a novel method for forming a carpet padding structure.

SUMMARY OF THE INVENTION

The above and other objects of the present invention are realized by providing a composite structure adapted for use as a carpet cushion underlay comprising a layer of open-cell, resilient polyurethane foam material substantially uniformly impregnated with a fluid composition containing a polymer which has been dried and cured after impregnation to produce a foamed open-cell, resilient structure formed primarily of the polymer wherein the open cells thereof partially comprise the foam material. The composite structure further comprises a substrate laminated to the impregnated foam, the substrate preferably being a scrim of the type customarily used as a primary backing for the yarn of a tufted carpet.

The present invention also provides a method of making a composite structure comprising substantially uniformly impregnating with a reverse roll application a layer of open-cell, resilient foam material with a latex composition containing a polymer such as a cold styrene-butadiene copolymer, a natural rubber, or a combination of the two, laminating, before the latex is dried, a substrate to the foam material and drying the latex composition to produce a foamed, open-cell, resilient structure having the substrate secured thereto.

DETAILED DESCRIPTION OF THE INVENTION

Figure 1:
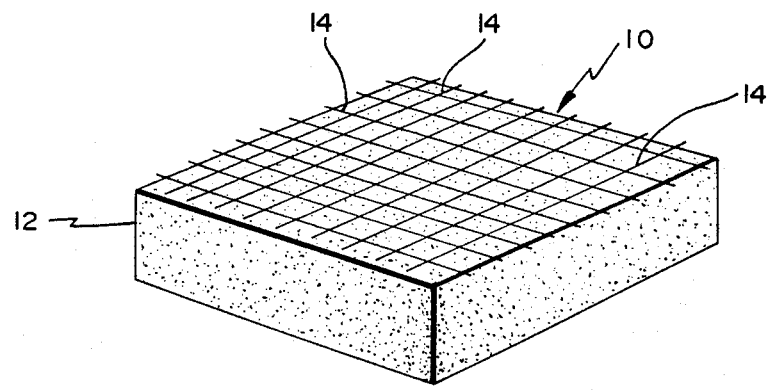
FIG. 1 is an elevational view of a carpet cushion structure of the invention.

Referring initially to FIG. 1, a composite carpet padding structure according to the present invention is indicated generally as numeral 10. Carpet padding structure 10 preferably comprises a carrier layer or base foam material 12 which is a conventional, low-density, open-celled, resilient foamed polyurethane (either polyester or polyether), and most preferably the foam has a density of less than about 1.5 lb./cu.ft.

The base foam material 12 is impregnated with a fluid composition containing a desired polymer, preferably by using a reverse roll applicator, in a method which will be discussed in more detail later in the specification. Preferably the fluid composition employed is a latex (i.e., water emulsion), in order that a substantially complete impregnation or distribution throughout the foamed material may be achieved.

The fluid composition comprises a polymeric material compatible with the base foam material and which is capable of suspension in a fluid for impregnation of the open cells of the foam material. It will be understood by those skilled in the art that the particular polymer selected will depend upon the properties desired in the final composite structure and application to which it is to be put. Illustrative but not limitative of such polymers are synthetic rubbers such as the styrene-butadiene copolymers, acrylonitrile-butadiene-styrene terpolymers, etc.; natural rubbers; acrylic and methacrylic polymer and polymers; polyvinyl chloride or combination of these polymers.

In addition, suitable conventional fillers (e.g., mineral fillers, calcium carbonates alumina hydrate, barytes, limestone, talc, etc.), coloring agents, curing agents, or other adjuvants may be incorporated in the fluid polymer composition prior to impregnation.

It has been determined in accordance with the present invention, directed to a carpet cushion underlay or padding, that the preferred thermoplastic polymers for use in the latex are styrene-butadiene rubber (SBR) in cold or non-carboxylated form, natural rubber, or a combination of the two. The term "cold SBR", which is commonly used and well known in the art, refers to a styrene-butadiene copolymer which is cross-linked or cured with sulfur. When used to impregnate a low density, open-celled polyurethane foam, the above-identified preferred thermoplastic polymers yield a cushion or padding end product, especially well-suited for use as a carpet padding, having substantially improved physical properties, including compression resistance, resilience and resistance to shear force or tearing. Instead of retaining the mechanical properties of the base foam, as appears to be the result in most of the prior art impregnated foam systems, the mechanical properties of the impregnated foam according to the preferred embodiment more closely approximate those of a foamed product made of the polymer contained in the latex. Thus, the foam base material 12 may be considered a "carrier" for the polymer latex, providing a matrix around which the latex may be dried into final form.

The composite carpet cushion structure 10 also preferably has at least one substrate layer 14 laminated thereto in the manufacturing process. Substrate 14 may be made of one of several types of suitable material, and is preferably a woven scrim of the type conventionally sued as a primary backing for tufted carpet. One suitable substrate is manufactured by Amoco, and sold under the registered trademark "Action-Bac". Other woven, non-woven or porous sheet materials may also be suitable for use as the substrate, examples of which include acrylics, polypropylene, nylon, cellulose or jute, having a density of approximately one half to 4 ounces per square yard. The substrate 14 serves to further improve the mechanical properties of the impregnated foam structure, providing increased dimensional stability, improved distribution of compressive forces over a wider area, and further improves resistance to tearing of the padding material. The latter of these is especially important in carpet padding which is to be secured to a flooring surface with adhesive. The improved resistance to tearing evidenced in the padding of the present invention facilitates the complete removal of such padding (e.g., for replacement) with reduced chances that the padding will tear at the locations where the padding has been adhered to the flooring surface. Substrates may be used on both the upper and lower surfaces of the carpet cushion structure 10, to provide a lower surface for bonding to the flooring and an upper surface facilitating the ability of the carpet to slide across the surface.

Figure 2:
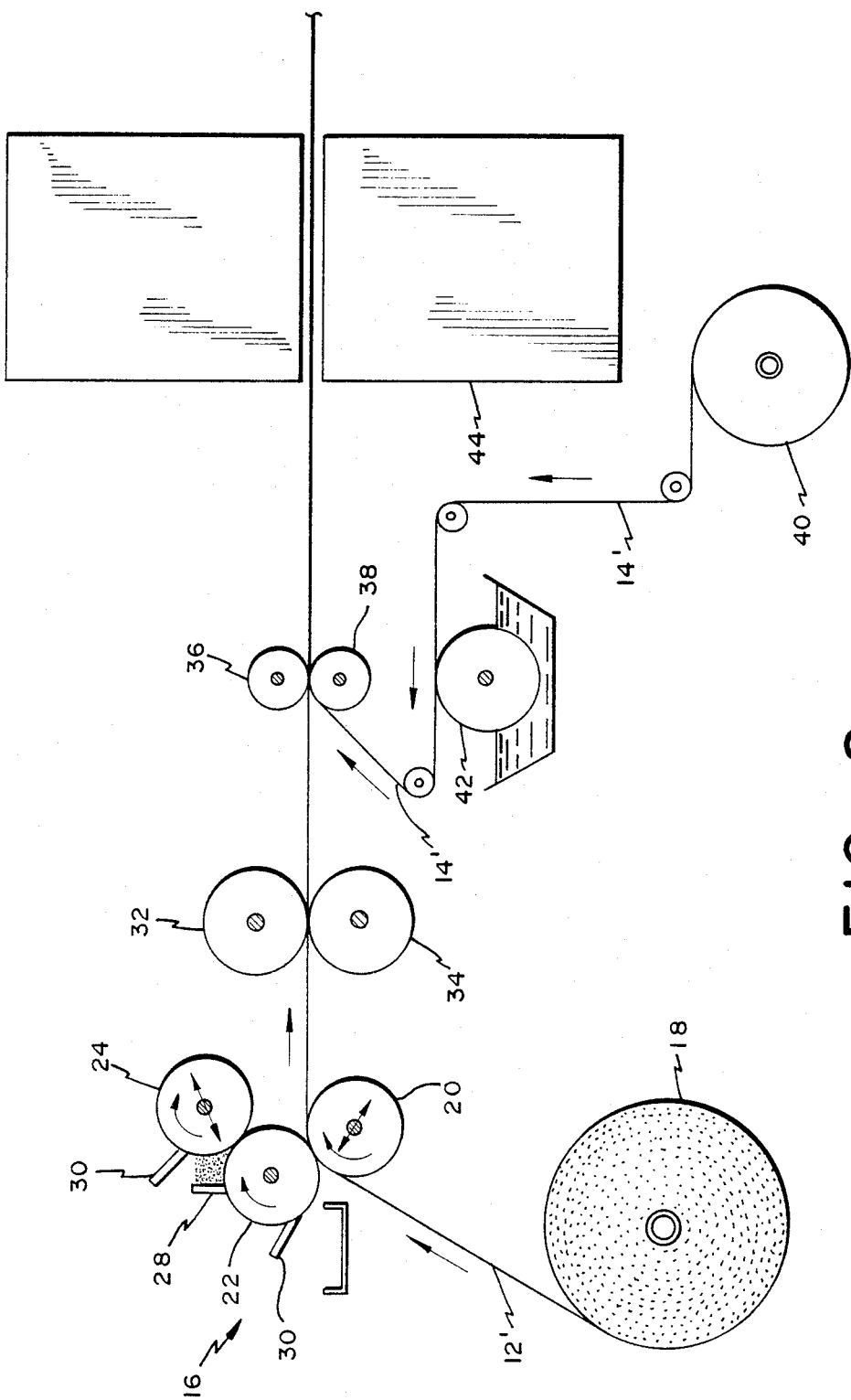
FIG. 2 is a side elevational view of an apparatus designed to produce a carpet cushion structure in accordance with the present invention.

Referring now to FIG. 2, a substantially diagrammatic side elevation view is depicted of an apparatus 16 used to produce the composite carpet padding structure of the present invention. The polymer latex is preferably applied in the present invention using a reverse roll applicator. The open-celled polyurethane foam base material 12' is fed from a roll 18 over rubber backing roll 20. Transfer roll 22 and metering roll 24 coact to load transfer roll 22 with a predetermined amount of the polymer latex 26 from coating dam 28, the polymer latex being applied to the polyurethane foam 12' as the foam passes through a nip between transfer roll 22 and rubber backing roll 20. Both transfer roll 22 and metering roll 24 are provided with doctor blades 30 which act to prevent excessive buildup of the polymer latex. It is to be noted with respect to FIG. 2 that the arrows are included to indicate direction of travel of the sheets and rollers.

After the polymer latex has been applied to the polyurethane foam material, the sheet 12' is passed between a pair of squeeze rolls 32, 34 which compress the foam and force the latex to fully penetrate and impregnate the entire thickness of the foam sheet 12'. The foam sheet is then passed, prior to the drying stage, between a pair of laminating rolls 36, 38 at which point a laminate substrate 14' is contacted with the foam sheet on one surface thereof.

The laminate substrate 14' is itself fed from a roll 40, preferably across an adhesive applicator roll 42, and brought into contact with a lower surface of impregnated foam sheet 12' at laminating rolls 36, 38. The foam sheet and substrate are pressed together between rolls 36 and 38, and the polymer latex, which has not yet dried, is pressed between the fibers of the substrate and the latex substantially coats the fibers as well. The composite carpet cushion structure is then passed through a heater 44 to evaporate the water from the latex in forming the final product.

It should be noted that, although the process is described as including the application of adhesive to the substrate prior to contacting the foam sheet material, the latex itself may provide sufficient bonding between the foam and the substrate for certain substrates and for certain anticipated uses. In these instances, the application of the adhesive to the substrate may be omitted.

Figure 3:
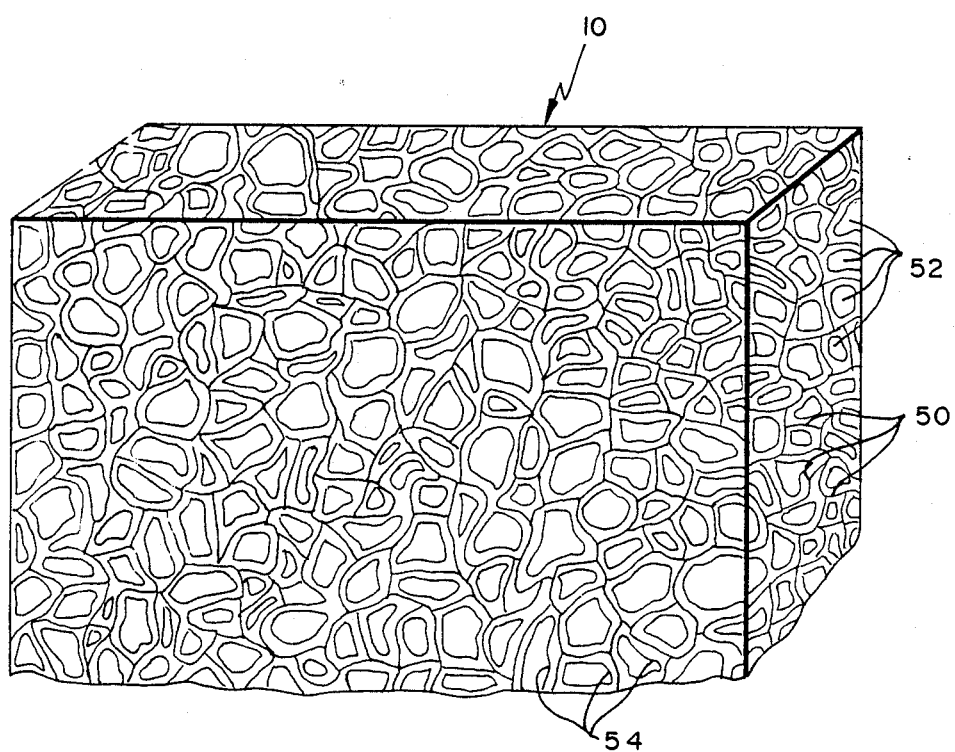
FIG. 3 is a cross-sectional view of a carpet cushion structure of the invention.

The impregnated foam portion of the end product 10 is shown in cross-section in FIG. 3. There it can be seen that the interior walls 50 of the open cells 52 of the foam are coated with the impregnant composition 54 according to the present invention. It will be understood by those skilled in the art that the composition of the fluid polymer may be adjusted to control the density of the final composite structure.

The composite carpet cushion product preferably should employ a foam material 12 having a thickness in the range of approximately 80 to 650 mils. When such a foam is impregnated with the cold styrene-butadiene polymer, natural rubber, or combination of the two, a carpet padding having highly desirable properties, such as resiliency over an extended period of time, is produced.

The invention is illustrated by the following non-limiting examples.

EXAMPLE 1

A flexible, light-weight (less than 1 lb./cubic ft. density) open-celled urethane foam layer having a thickness of about 0.5 in. is saturated with a previously prepared latex composition containing 22.5%, by weight, of cold styrene-butadiene rubber. Calcium carbonate, silicates, barytes, aluminum trihydrates, etc., or a combination of fillers, at levels of 1–1000 parts based on 100 parts of dry polymers in the system, curing system (as shown), antioxidant (alkylated phenol), and soap (potassium oleate) are also added. The latex composition containing 80% solids is applied to the flexible urethane foam using the reverse roll applicator and squeeze rolls shown by FIG. 2 to uniformly dispense (saturate) the latex throughout the flexible urethane foam. The saturated foam is carried on an endless open mesh belt into a curing oven having vertical air flow and a temperature from 120° F. to 550° F. to dry and cure the saturated urethane foam. The resultant flexible uniform cell structure foam exhibits all the qualities of the latex polymer compound product which was used to saturate the urethane foam.

The use of the light-weight urethane flexible foam only as a carrier and cell structure controller allows a cellular product to be made from most aqueous polymers of fluid compounds which heretofore could not easily be formed into foamed structures. The density of the product may be varied between about 1.5 and 40 lbs. per cubic foot. Thicknesses 0.0675 inch to 4.00 inches may also be obtained. In particular, when cold or non-carboxylated styrene-butadiene rubber, natural rubber, or a combination of these two is employed in impregnating a foam layer between 80 and 650 mils in thickness, the cushion structure produced will have desirable physical properties for carpet underlay service, namely improved compression set, improved compression resistance, and improved resistance to tearing.

FIG. 1 depicts the foamed structure 10 produced by Example 1.

EXAMPLE 2

The procedure of Example 1 was followed utilizing the materials and process parameters set forth below.

|  | Dry | Wet |
|---|---|---|
| 70% Cold SBR Latex | 100.00 | 142.86 |
| Water |  | To adjust composition to 80% total solids |
| 20% Potassium Oleate | 3.00 | 15.00 |
| Calcium Carbonate | 250.00 | 250.00 |
| Use polyacrylate thickener to adjust viscosity to 1500–3000 CPS. |  |  |
| Add cure system prior to use. |  |  |

| CURE SYSTEM | Dry | Wet |
|---|---|---|
| 50% Antioxident (Alkylated Phenols) | 1.50 | 3.00 |
| 60% Zinc Oxide Dispersion | 2.00 | 2.83 |
| 60% Sulfur Dispersion | 1.70 | 2.83 |
| 50% Zinc Diethyl Thiocarbamate Dispersion | 1.00 | 2.00 |
| 50% ZMBT Dispersion (Zinc Mercapto Benzyl Thiozole) | 1.80 | 3.60 |

EXAMPLE 3

Two carpet padding samples of different density were produced in accordance with Examples 1 and 2 of the present invention, and were tested to measure properties of particular importance for products used in carpet underlay service.

| Sample CPS-20 | |
|---|---|
| Weight | 49.1 ounces per sq. yd. |
| Density | 16.1 lbs. per cu. ft. |
| Thickness | 0.255 in. |
| Aging (Heat) (24 hrs./275° F.) | Pass |
| Compression Set (22 hrs./158° F.) | |
| 30 min. recovery/70° F. | 23.7% |
| 6 hr. recovery/70° F. | 13.2% |
| Compression Resistance (25% deflection) | 5 lbs. per sq. in. |
| Tensile Strength | |
| Length | 86.8 lbs. force |
| Width | 94.4 lbs. force |
| Percent Elongation | |
| Length | 20.7% |
| Width | 31.3% |
| Sample CPS-35 | |
| Weight | 81.1 ounces per sq. yd. |
| Density | 29.6 lbs. per cu. ft. |
| Thickness | 0.228 in. |
| Aging (Heat) (24 hrs./275° F.) | Pass |
| Compression Set (22 hrs.158° F.) | |
| 30 min. recovery/70° F. | 25% |
| 6 hr. recovery/70° F. | 19.5% |
| Compression Resistance (25% deflection) | 20 lbs. per sq. in. |

While the carpet underlay cushion structure of the present invention has been described above with respect to a preferred embodiment, it will be recognized by those skilled in the art that variations and modifications may be made without departing from the spirit and scope of the present invention. The scope of protection is therefore to be determined by reference to the appended claims.

What is claimed is:

1. A carpet underlay cushion structure comprising:
   a carrier layer of open-cell, resilient polyurethane foam material, said resilient foam material being substantially completely and uniformly impregnated with a latex containing a polymer wherein said polymer is selected from the group consisting of non-carboxylated styrene-butadiene rubber, natural rubber, and a combination of styrene-butadiene and natural rubbers;
   the impregnated foam material being dried after said impregnation to produce a foamed, open-cell, resilient composite cushion structure wherein the open cells thereof partially comprise said carrier layer of polyurethane foam material.

2. A carpet underlay cushion structure as defined in claim 1 further comprising a substrate securely adhered to said impregnated foam material, said substrate extending completely across at least one surface thereof.

3. A carpet underlay cushion structure as defined in claim 2 wherein said substrate is adhered to said foam material by an adhesive, said adhesive being a component independent of said polymer latex.

4. A carpet underlay cushion structure as defined in claim 2 wherein said substrate is adhered to said foam material by said polymer once said latex in said carpet underlay cushion structure is dried.

5. A carpet underlay cushion structure as defined in claim 4 wherein said substrate is substantially completely covered by said polymer when said latex is dried.

6. A carpet underlay cushion structure as defined in claim 5 wherein said polymer contained in said latex consists essentially of non-carboxylated styrene-butadiene rubber.

7. A carpet underlay cushion structure as defined in claim 6 wherein said carrier layer has a thickness in the range of about 80 to 650 mils.

8. A carpet underlay cushion structure as defined in claim 7 wherein said carrier layer has an initial density of less than about 1.5 pounds per cubic foot.

9. A carpet underlay cushion structure as defined in claim 5 wherein said polymer contained in said latex consists essentially of a combination of styrene-butadiene rubber and natural rubber.

10. A carpet underlay cushion structure as defined in claim 9 wherein said carrier layer has a thickness in the range of about 80 to 650 mils.

11. A carpet underlay cushion structure as defined in claim 10 wherein said carrier layer has an initial density of less than about 1.5 pounds per cubic foot.

12. A carpet underlay cushion structure comprising:
a carrier layer of open-cell, resilient polyurethane foam material, said resilient foam material being substantially completely and uniformly impregnated with a latex containing a polymer and greater than 80 percent total solids content;
a substrate securely adhered to and extending completely across at least one surface of said impregnated foam material;
the impregnated foam material and substrate being dried after said impregnation to produce a foamed, open-cell, resilient composite cushion structure wherein the open cells thereof partially comprise said carrier layer of polyurethane foam material.

13. A carpet underlay cushion structure as defined in claim 12 wherein said polymer in said latex comprises non-carboxylated styrene-butadiene rubber.

14. A carpet underlay cushion structure as defined in claim 12 wherein said polymer in said latex comprises natural rubber.

15. A carpet underlay cushion structure as defined in claim 12 wherein said polymer in said latex comprises a combination of styrene-butadiene rubber and natural rubber.

16. A method for making a carpet underlay cushion structure comprising:
applying, onto a carrier layer of open-cell, resilient polyurethane foam material, a latex containing a polymer selected from the group consisting of non-carboxylated styrene-butadiene rubber, natural rubber, and a combination of styrene-butadiene rubber, natural rubber, and a combination of styrene-butadiene rubber and natural rubber;
substantially completely and uniformly impregnating said carrier layer with said latex;
pressing a substrate made of a woven material onto a surface of said carrier layer; and
drying and curing said latex to produce a foamed open-cell, resilient polymer structure wherein the open cells thereof partially comprise said foam material.

17. A method as recited in claim 16 further comprising applying an adhesive to said substrate prior to pressing said substrate onto said carrier layer.

18. A method as recited in claim 17 wherein said application of said latex is accomplished by a reverse roll application.

19. A method as recited in claim 18 wherein said impregnation of said carrier layer is accomplished by passing said carrier layer, after said latex has been applied, through a pair of squeeze rolls which compress said carrier layer by a predetermined amount.

* * * * *

UNITED STATES PATENT AND TRADEMARK OFFICE
CERTIFICATE OF CORRECTION

PATENT NO. : 4,957,798
DATED      : September 18, 1990
INVENTOR(S): John Bogdany It is certified that error appears in the above-identified patent and that said Letters Patent is hereby corrected as shown below:

On the cover page, item [73] - Assignee, delete "System" and substitute therefor --Systems--.

In the Abstract, line 3, delete "naterial" and substitute therefor --material--.

In Column 10, claim 16, lines 18 and 19, delete "natural rubber, and a combination of styrene-butadiene rubber".

Signed and Sealed this

Thirty-first Day of March, 1992

Attest:

HARRY F. MANBECK, JR.

*Attesting Officer*     *Commissioner of Patents and Trademarks*